Nov. 14, 1933.  G. F. QUINN  1,935,519
TREAD MEMBER AND METHOD OF MAKING THE SAME
Filed Nov. 25, 1932
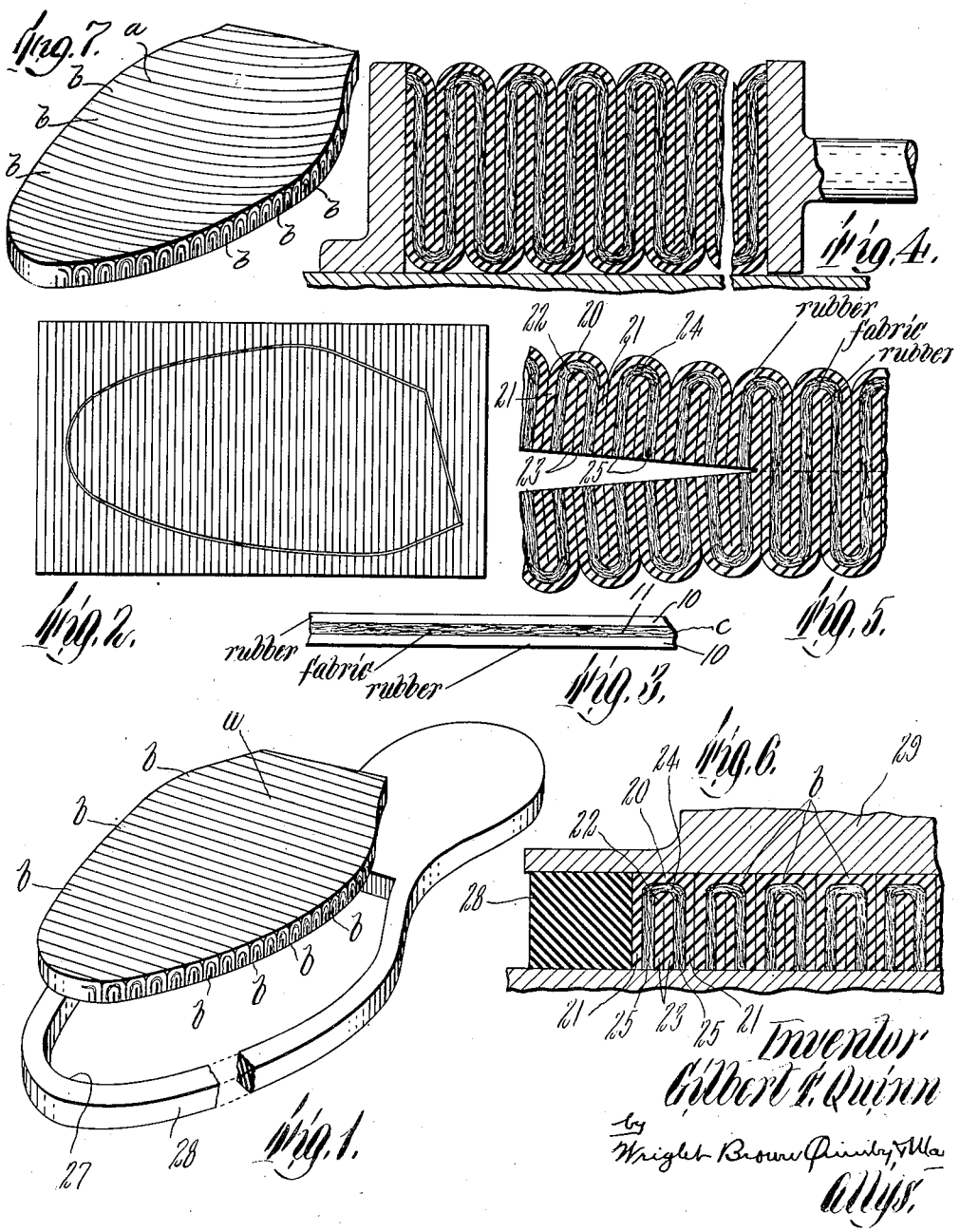

Patented Nov. 14, 1933

1,935,519

UNITED STATES PATENT OFFICE 1,935,519

TREAD MEMBER AND METHOD OF MAKING THE SAME

Gilbert F. Quinn, Revere, Mass.

Application November 25, 1932
Serial No. 644,239

10 Claims. (Cl. 154—2)

This invention relates to a tread member adapted to constitute the major portion of a complete tread, the tread member to which the invention relates being adapted to be secured in, and surrounded by, a marginal outer frame-shaped tread portion which constitutes, with the tread member, a complete tread adapted to be incorporated in a shoe, or to be secured to a stair tread, or other fixed object, to provide a somewhat yielding frictional tread surface, which in a shoe tread has a suitable degree of flexibility.

The invention consists in the improved method of rapidly and inexpensively making a tread member, and in certain improvements in the arrangement of the elements thereof, all as hereinafter described and claimed.

Of the accompanying drawing forming a part of this specification,—

Figure 1 shows in perspective a tread member made by my improved method, and a marginal outer member formed to surround the tread member.

Figure 2 is a side view showing a body prepared to constitute the stock from which a blank of twice the thickness of the tread member may be cut by a die, and showing also the cut made by the die, the components of said sheet being uncured rubber and frictioned textile fabric.

Figure 3 is an edge view of a portion of a laminated flexible sheet from which the body shown by Figure 2 is prepared by folding or plaiting the sheet.

Figure 4 shows in section a portion of the body shown by Figure 2, and means for pressing its plaits or folds together.

Figure 5 shows in section a portion of the blank cut from the body shown by Figure 2, said portion being partly split into two tread members.

Figure 6 shows in section portions of a vulcanizing mold, a portion of a tread member and a portion of the frame-shaped outer member shown by Figure 1 enclosed in the mold preparatory to being vulcanized and otherwise conditioned by heat and pressure.

Figure 7 shows in perspective the tread member shown by Figure 1 having joints which are curved.

The same reference characters indicate the same parts in all of the figures.

In making the tread member hereinafter described, I form a laminated sheet of any desired area; a portion of one edge of the sheet being shown by Figure 3. Said sheet includes two surface layers 10 of uncured rubber, and an intermediate layer 11 of frictioned textile fabric or other fibrous material. I dispose the laminated sheet in contacting folds or plaits as shown by Figures 4 and 5, said plaits including neck portions and intermediate wing portions connected by the neck portions, the plaits being pressed together by means shown by Figure 4. A body of twice the thickness of an intended tread member is thus formed, a side view of said body being shown by Figure 2. I then cut from said body by a suitable die, a blank having the marginal contour and twice the thickness of an intended tread member, the contour of the blank being in this instance sole-shaped, as shown by Figure 2. The opposite sides of the blank are formed by the neck portions of the plaited sheet. The wing portions, connected by the neck portions, extend from side to side of the blank, as shown by Figure 4. I then split the blank between its sides and thereby convert it into two tread members, each formed as shown by Figure 1, and having a tread face on which the cut edges of the fabric layer 11 are exposed.

Finally, I vulcanize the rubber components of the tread members, as described later, to elastically bond the wing portions and the neck portions together.

The folding or plaiting of a laminated sheet as a step of the method permits low cost and desirable speed of manufacture.

The tread member formed by the method above described and designated as a whole by $a$ in Figure 1, is composed of a plurality of parallel laminated strips folded so that each strip includes a neck portion and two parallel wings integral with the neck. Each folded strip is designated as a whole by $b$ in Figure 1.

Each folded strip includes an outer folded layer of uncured rubber having a neck portion 20, and two wing portions 21, an inner folded layer of uncured rubber having a neck portion 22 and two wing portions 23, and an intermediate folded layer of frictioned textile fabric between the outer and inner layers, having a neck portion 24 and wing portions 25.

The threads of the fabric layer extend through the wing and neck portions thereof, so that the ends of the threads are exposed on the ends of the wings and on the tread face of the tread member.

The wing portions 22 of the several strips are in contact with each other, side by side, and the wing portions 23 of the strips are in contact with each other edge to edge, the uncured rubber being sufficiently tacky to cause adhesion of the wing portions 21 to each other, the adhesion of the wing portions 23 to each other, and the adhesion of the wing portions 21 and 23 to the intermediate fabric layer.

The tread member a formed as shown by Figure 1 by the above described method, is inserted before vulcanization in an opening 27 (Figure 1), formed in an outer body member 28 which, in this instance, has the form of an outer sole and is made of uncured rubber, and the assembly is inserted in a vulcanizing mold 29, portions of which are shown by Figure 6.

The mold is adapted to exert forming pressure on all the surfaces of the assembly, and is subject to a vulcanizing temperature until the rubber components are sufficiently vulcanized. The pressure exerted on the necks of the folded strips a, flattens the exposed sides of said necks as indicated by Figure 6.

The vulcanizing operation elastically bonds the wing portions 21 of the several strips together, and the wing portions 23 of each inner folded layer to each other. Said operation also elastically bonds the neck portions 20 of the several strips together edge to edge, so that they constitute a practically homogeneous continuous reinforcing layer or back, from which the bonded wing portions project.

It will now be seen that the completed member a has the advantages next stated, well adapting it for use as the tread member of an outer sole.

The laminated necks elastically bonded together throughout the entire length and width of the member a collectively constitute a homogeneous reinforcing back which is impervious to water and is suitably flexible for use in a shoe sole. The laminated wing portions projecting from the reinforcing back constitute an equally impervious and flexible outer or tread portion of the member a.

The threads of each textile layer extend continuously from the tread face of one wing through the sealed impervious back, and therefrom to the tread face of the other wing, the length of the threads being more than twice as great as the thickness of the tread member.

The portions of the threads which extend through the neck are covered and sealed by the outer rubber layer of the neck, so that water from the tread face seeping between the threads cannot seep through the neck.

In footwear, tread members composed of strips assembled side by side, the ends of threads incorporated in the strips have usually been exposed on the back face as well as on the tread face of the member, so that water is liable to seep through the back face of the tread member to the inner sole of a shoe. To prevent this it has been customary to cover the back face formed by the strips with an added backing layer of waterproof fabric coextensive with said back face. Such backing layer, which is not required in the tread member here shown, involves increased cost of material and labor, and a decrease in the rapidity of production.

A tread member characterized as described, can be considerably thinner than any of which I am aware, heretofore made, without detriment to its waterproof quality and strength, because the waterproof back formed by the neck portions of the folded strips constitutes a considerable portion of the thickness of the tread member, so that the wing portions may be relatively narrow.

The threads of the fabric layers of each strip b, extending as they do through the wing and neck portions of the folded strips, and having their ends exposed only on the tread faces of the wing portions, impart a desirable frictional quality to the tread face of the member, and because of their tensile strength due to their elongation and their close adhesion to the vulcanized rubber parts with which they contact, contribute materially to the strength and durability of the member.

The blank formed as described may be split midway between its sides before vulcanization of the rubber by a band knife, not shown, a portion of the cut and the location thereof being indicated by Figure 5.

When the contour of the blank is sole-shaped, as shown by the drawings, one of the tread faces thus produced is a "right" and the other a "left" tread face, a pair of right and left tread members being therefore produced from each blank by one cut.

The strips b shown by Figure 1 have straight edges forming straight joints extending across the tread member. When said member is used in footwear the flexure of the member caused by the act of walking may sometimes be liable to cause an objectionable opening of the joints on the tread face formed by the operation of splitting the blank. This liability may be prevented by bending the strips b so that the joints formed thereby deviate from straight lines extending across the member.

As shown by Figure 7 the meeting faces of the strips b and the joints formed thereby are curved so that one face of each strip is convex and bulges into a concave face of the next strip, the joints being thus caused to deviate from straight lines. This deviation which is caused by suitably bending the strips b before the rubber constituents are vulcanized, prevents the above mentioned liability of the opening of the joints on the tread face.

The tread member characterized as described may be otherwise called an insert constituting a member of a complete tread which includes a marginal outer portion surrounding the insert.

The fabric layer 11 (Figure 3), may be composed of any desired number of fabric laminations coated with vulcanizable frictioning material, and assembled to form a layer 11 of the desired thickness. The cloth of the layer 11 is preferably cut on the bias so that the ends of all of the interwoven threads are exposed on the tread face of the completed tread member or insert. In a relatively thin insert the fabric layer 11 may be thinner than in a thicker insert. It is feasible to make an insert of the character described about one-eighth of an inch thick. Such insert may be used in the bottom of a rubber boot or overshoe, the margin of the insert being surrounded by the marginal portion of the bottom.

The backs 20 formed by the plaiting operation are moisture proof so that when they are flattened and vulcanized under pressure they constitute a continuous moisture-proof back adapted to be seated on a supporting surface and prevent access of moisture thereto. The use of an independent moisture-proof backing sheet such as has been heretofore employed, is therefore obviated.

I claim:

1. A tread member composed of strips of rubber and textile material, said strips being united to each other side by side to form joints extending across the wear surface of the member, the strips being bent so that said joints deviate from straight lines, for the purpose stated.

2. A tread member composed of a plurality of folded substantially U-shaped strips including necks arranged edge to edge and forming the back of the member, and wings projecting side by side from the necks, each strip including two surface layers of vulcanized rubber, and an intermediate layer of textile fabric vulcanized to the surface layers, the neck portions being vulcanized to each other edge to edge, and the wing portions being vulcanized to each other side by side and forming close joints extending across the tread face of the member, said joints deviating from straight lines to prevent liability of the opening of the joints at the tread face.

3. A tread member composed of a plurality of folded substantially U-shaped strips including necks arranged edge to edge and forming the back of the member, and wings projecting side by side from the necks, each strip including two surface layers of vulcanized rubber, and an intermediate layer of textile fabric vulcanized to the surface layers, the neck portions being vulcanized to each other edge to edge, and the wing portions being vulcanized to each other side by side and forming close joints extending across the tread face of the member, said joints being curved to prevent liability of the opening of the joints at the tread face.

4. That improvement in the method of making tread members which consists in forming a laminated sheet including two surface layers of uncured rubber, and an intermediate layer of frictioned textile fabric, disposing said sheet in contacting folds or plaits including neck portions, and wing portions connected by the neck portions, thereby forming a body exceeding the thickness of an intended tread member, cutting a blank of the contour of an intended member from said body, said blank having opposite sides formed by the neck portions, and wing portions connected by the neck portions and extending from side to side of the blank, splitting the blank between its sides and thereby converting it into two tread members, each having a tread face on which the edges of the fabric layer are exposed, and a back face formed by said neck portions, and vulcanizing the rubber components of said tread members to elastically bond the wing portions and the neck portions together.

5. That improvement in the method of making tread members which consists in forming a laminated sheet including two surface layers of uncured rubber, and an intermediate layer of frictioned textile fabric, disposing said sheet in contacting folds or plaits including neck portions and wing portions connected by the neck portions, thereby forming a body of twice the thickness of an intended tread member, cutting a blank of the contour of an intended member from said body, said blank having opposite sides formed by the neck portions, and wing portions connected by the neck portions and extending from side to side of the blank, splitting the blank between its sides and thereby converting it into two tread members, each having a tread face on which the edges of the fabric layer are exposed, and a back face formed by said neck portions, and subjecting each member to heat and pressure to unite the wing portions to each other side by side, and unite the neck portions to each other edge to edge, and mold said neck portions so that they collectively form a homogeneous reinforcing moisture-proof back formed to bear closely on a seat.

6. That improvement in the method of making tread members which consists in converting a sheet composed of fibrous material and a moisture-proof coating on both sides of the fibrous material into continuously connected plaits, thereby forming a body thicker than the sheet, and having opposite sides formed by neck portions of the plaits, cutting from said body a blank of predetermined marginal contour, splitting the blank between its sides to form two tread members, each having the marginal contour of the blank and a frictional tread face exposing the fibrous material, and vulcanizing each member under pressure to convert said neck portions into continuous moisture-proof backs adapted to be seated on supporting surfaces, and prevent moisture entering the fibrous material from penetrating said backs.

7. That improvement in the method of making tread members which consists in converting a sheet composed of fibrous material and a moisture-proof coating on both sides of the fibrous material into continuously connected plaits, thereby forming a body thicker than the sheet, and having opposite sides formed by neck portions of the plaits, cutting from said body a sole shaped blank, one side of which has the marginal contour of a "right" sole, and the other the marginal contour of a "left" sole, splitting the blank between its sides to form two tread members one having a "right" frictional tread face, and the other a "left" frictional tread face, each tread face including portions of the fibrous material, and vulcanizing each member under pressure to convert said neck portions into continuous moisture-proof backs, adapted to be seated on supporting surfaces, and prevent moisture entering the fibrous material from penetrating said backs.

8. A tread member composed of parallel substantially U-shaped strips, each including a moisture-proof neck portion and two wing portions connected by the neck portion, and composed of originally uncured rubber and fibrous material, the wing portions being elastically bonded together side by side by vulcanization, and the neck portions elastically bonded together edge to edge by vulcanization, said neck portions being flattened and collectively forming a continuous back impervious to moisture, and adapted to be secured to a shoe bottom surface, said back preventing seepage of moisture through the fibrous material to the shoe bottom surface, and obviating the employment of an independent impervious backing, the tread member having a frictional tread surface on which the fibrous material is exposed.

9. A tread member composed of parallel substantially U-shaped strips, each composed of two surface layers originally of uncured rubber, and an intermediate layer of fibrous material, each strip including a moisture-proof neck portion and two wing portions connected by the neck portion, the wing portions being elastically bonded together side by side by vulcanization, and the neck portions elastically bonded together edge to edge by vulcanization, said neck portions being flattened and collectively forming a continuous back impervious to moisture, and adapted to be secured to a shoe bottom surface, said back preventing seepage of moisture through the fibrous material to the shoe bottom surface, and obviating the employment of an independent impervious backing, the tread member having a frictional tread surface on which the fibrous material is exposed.

10. That improvement in the method of making tread members which consists in forming a sheet including fibrous material and a moisture-proof coating on both sides of the fibrous material, disposing said sheet in contacting folds or plaits including moisture-proof neck portions and wing portions connected by the neck portions, thereby forming a body exceeding the thickness of an intended tread member, cutting a blank of the contour of an intended tread member from said body, said blank having opposite sides formed by said neck portions, and wing portions connected to the neck portions, and extending from side to side of the blank, splitting the blank between its sides and thereby converting it into two tread members, each having a frictional tread face on which the fibrous material is exposed and a back face formed wholly by said neck portions, and vulcanizing the rubber components of said members to elastically bond the wing portions and the neck portions together, and convert the neck portions into continuous moisture-proof backs each adapted to be seated on a supporting surface, said backs preventing seepage of moisture through the fibrous material to said supporting surface.

GILBERT F. QUINN.